United States Patent
Nozaki et al.

(10) Patent No.: US 7,261,662 B2
(45) Date of Patent: Aug. 28, 2007

(54) HYDRAULIC CONTROL APPARATUS FOR AUTOMATIC TRANSMISSION OF VEHICLE

(75) Inventors: Kazutoshi Nozaki, Nisshin (JP); Masami Kondo, Toyota (JP); Kazuyuki Noda, Handa (JP); Takuya Fujimine, Hamamatsu (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 277 days.

(21) Appl. No.: 11/138,273

(22) Filed: May 27, 2005

(65) Prior Publication Data

US 2005/0266959 A1 Dec. 1, 2005

(30) Foreign Application Priority Data

May 31, 2004 (JP) ............................. 2004-161581

(51) Int. Cl.
*F16H 61/12* (2006.01)
(52) U.S. Cl. ........................ 475/119; 475/127
(58) Field of Classification Search ................ 475/119, 475/127, 133
See application file for complete search history.

(56) References Cited

U.S. PATENT DOCUMENTS

2004/0063534 A1   4/2004   Fujimine et al.

2006/0172856 A1 *   8/2006   Takagi ......................... 477/127
2007/0066435 A1 *   3/2007   Takagi et al. ................ 475/127

FOREIGN PATENT DOCUMENTS

| EP | 354006 | * | 2/1990 | ................. 477/906 |
| JP | 9-303545 | | 11/1997 | |
| JP | 2004-36672 | | 2/2004 | |

* cited by examiner

*Primary Examiner*—Sherry Estremsky
(74) *Attorney, Agent, or Firm*—Oblon, Spivak, McClelland, Maier & Neustadt, P.C.

(57) ABSTRACT

A hydraulic control apparatus for use with a vehicle's automatic transmission, the apparatus including a fail-safe switch valve which has an escape-related output port connected to a drain port of a transmission-related solenoid valve corresponding to an escape-related frictional coupling device to establish an escape-related speed step, and additionally has an escape-related input port to which a hydraulic pressure is inputted, and a drain port from which a hydraulic fluid is drained, wherein the fail-safe switch valve is selectively switchable to a normal communication state thereof in which the escape-related output port and the drain port are communicated with each other and the escape-related input port is shut off, and to a fail-related communication state thereof in which the escape-related output port and the escape-related input port are communicated with each other, and the drain port is shut off, so that a hydraulic pressure is supplied from the escape-related output port of the fail-safe switch valve to the drain port of the transmission-related solenoid valve corresponding to the escape-related frictional coupling device.

12 Claims, 8 Drawing Sheets

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

I ---- INPUT
O ---- OUTPUT

| RANGES | SPEED STEPS |
|--------|-------------|
| D | 1,2,3,4,5,6,7,8 |
| 7 | 1,2,3,4,5,6,7 |
| 6 | 1,2,3,4,5,6 |
| 5 | 1,2,3,4,5 |
| 4 | 1,2,3,4 |
| 3 | 1,2,3 |
| 2 | 1,2 |
| L | 1 |

SHIFT UP ↑ ↓ SHIFT DOWN

HYDRAULIC CONTROL APPARATUS FOR AUTOMATIC TRANSMISSION OF VEHICLE

The present application is based on Japanese Patent Application No. 2004-161581 filed on May 31, 2004, the contents of which are incorporated herein by reference.

BACKGROUND OF THE INVENTION

1. Field of the Invention

The present invention relates to a hydraulic control apparatus for use with an automatic transmission of a vehicle and particularly to improvements of a fail-safe technique that enables a vehicle to run, i.e., "escape" when transmission-related solenoid valves fall in a so-called "off-fail" state.

2. Discussion of Related Art

There is known a hydraulic control apparatus for use with an automatic transmission of a vehicle. The automatic transmission includes a plurality of hydraulically operated, frictional coupling devices, and establishes each one of a plurality of speed steps having respective different speed ratios, when the frictional coupling devices are selectively engaged or released (disengaged). The hydraulic control apparatus includes a plurality of transmission-related solenoid valves that are provided in association with the frictional coupling devices, respectively, and control respective hydraulic pressures supplied to the frictional coupling devices. Japanese Patent Application Publication No. 9-303545 discloses an example of the hydraulic control apparatus, and proposes to provide, between the transmission-related solenoid valves and the frictional coupling devices, a fail-safe valve that supplies, when the transmission-related solenoid valves fall in the "off-fail" state in which the solenoid valves cannot output respective hydraulic pressures, a hydraulic pressure to a pre-selected one of the frictional coupling devices so as to establish a pre-selected one of the speed steps, and thereby enables a vehicle to run, i.e., "escape".

However, in the above-indicated conventional hydraulic control apparatus, the fail-safe valve is provided between the transmission-related solenoid valves and the frictional coupling devices. Therefore, when the solenoid valves are normal, the above-indicated pre-selected frictional coupling device receives the hydraulic pressure via the fail-safe valve. This leads to increasing a length of a fluid (oil) channel and thereby lowering a responsiveness, and a control accuracy, of each of the solenoid valves with respect to its hydraulic control.

SUMMARY OF THE INVENTION

It is therefore an object of the present invention to provide a fail-safe technique that supplies, when transmission-related solenoid valves fall in an "off-fail" state, a hydraulic pressure to a pre-selected frictional coupling device so as to establish a pre-selected speed step, and thereby enables a vehicle to run, i.e., "escape", without lowering a responsiveness, and a control accuracy, of each of the solenoid valves with respect to its hydraulic control.

(1) According to a first feature of the present invention, there is provided a hydraulic control apparatus for use with an automatic transmission of a vehicle, the automatic transmission establishing each of a plurality of speed steps having respective different speed ratios, according to a corresponding one of a plurality of combinations of respective selective engaging and releasing of a plurality of hydraulically operated frictional coupling devices, the hydraulic control apparatus comprising a plurality of transmission-related solenoid valves which correspond to the hydraulically operated frictional coupling devices, respectively, and each of which has an input port to which a first hydraulic pressure is inputted, an output port from which a second hydraulic pressure is outputted, and a drain port from which a hydraulic fluid is drained, and includes a solenoid which changes a state in which the input port, the output port, and the drain port communicate with each other, so that the each transmission-related solenoid valve outputs, from the output port thereof, the second hydraulic pressure and thereby causes the engaging of a corresponding one of the hydraulically operated frictional coupling devices; and a fail-safe switch valve which has at least one escape-related output port connected to the drain port of at least one transmission-related solenoid valve corresponding to at least one escape-related frictional coupling device of the hydraulically operated frictional coupling devices that is to establish at least one escape-related speed step, and additionally has at least one escape-related input port to which a third hydraulic pressure is inputted, and at least one drain port from which the hydraulic fluid is drained, wherein the fail-safe switch valve is selectively switchable to a normal communication state thereof in which the at least one escape-related output port and the at least one drain port are communicated with each other and the at least one escape-related input port is shut off, and to a fail-related communication state thereof in which the at least one escape-related output port and the at least one escape-related input port are communicated with each other, and the at least one drain port is shut off, so that a fourth hydraulic pressure is supplied from the at least one escape-related output port of the fail-safe switch valve to the drain port of the at least one transmission-related solenoid valve corresponding to the at least one escape-related frictional coupling device. The first and second hydraulic pressures may be equal to, or different from, each other; and the third and fourth hydraulic pressures may be equal to, or different from, each other.

In the present hydraulic control apparatus for use with the automatic transmission of the vehicle, the fail-safe switch valve is connected to the drain port of the transmission-related solenoid valve corresponding to the escape-related frictional coupling device. If all the transmission-related solenoid valves fall in the off-fail state in which the solenoid valves cannot output respective hydraulic pressures, then the fail-safe switch valve is switched from the normal communication state thereof to the fail-related communication state thereof. Consequently the fail-safe switch valve supplies a hydraulic pressure to the drain port of the transmission-related solenoid valve corresponding to the escape-related frictional coupling device, and subsequently supplies, from the output port of the solenoid valve, the hydraulic pressure to the escape-related frictional coupling device so as to cause the engaging of the same. Thus, the escape-related speed step is established, and the vehicle is allowed to run, i.e., escape. The fail-safe switch valve is connected to the drain port of the transmission-related solenoid valve, and supplies the hydraulic pressure to the drain port. Therefore, under the normal condition, the hydraulic pressure is directly supplied from the transmission-related solenoid valve to the hydraulically operated frictional coupling device (i.e., the escape-related frictional coupling device), without flowing through the fail-safe switch valve. This arrangement contributes to preventing increasing of an overall length of a fluid channel in which the hydraulic fluid flows between the transmission-related solenoid valve and the escape-related frictional coupling device. Thus, the responsiveness, and control accuracy, of the transmission-related solenoid valve with respect to the hydraulic control thereof can be maintained.

(2) According to a second feature of the present invention that may be combined with the first feature (1), the hydraulic control apparatus further comprises a fail-related valve switching device which normally holds the fail-safe switch valve at the normal communication state thereof and, when the transmission-related solenoid valves fall in an off-fail state thereof in which the output port of each of the transmission-related solenoid valves communicates with the drain port thereof and the each transmission-related solenoid valve does not output the second hydraulic pressure, switches the fail-safe switch valve to the fail-related communication state thereof.

(3) According to a third feature of the present invention that may be combined with the first or second feature (1) or (2), the hydraulic control apparatus further comprises a shift lever which is selectively operable by a driver to each of a plurality of operation positions so as to select a corresponding one of the speed steps of the automatic transmission; and a manual valve which mechanically selects each of a plurality of fluid channels respectively corresponding to the operation positions to the each one of which the shift lever is selectively operable by the driver, wherein the fail-safe switch valve has a plurality of the escape-related input ports each of which receives the third hydraulic pressure from a corresponding one of the fluid channels, and additionally has a plurality of the escape-related output ports which are respectively connected to a plurality of the transmission-related solenoid valves respectively corresponding to a plurality of the escape-related frictional coupling devices to establish a plurality of the escape-related speed steps, respectively, and wherein when the shift lever is operated to the each operation position and the manual valve mechanically selects one of the fluid channels that corresponds to the each operation position, the fail-safe switch valve receives the third hydraulic pressure at one of the escape-related input ports thereof that corresponds to the one fluid channel mechanically selected by the manual valve, and outputs the fourth hydraulic pressure from one of the escape-related output ports thereof that corresponds to the one escape-related input port, to a corresponding one of the transmission-related solenoid valves so as to establish a corresponding one of the escape-related speed steps.

In the hydraulic control apparatus in accordance with the third feature (3), when the shift lever is operated or moved, the manual valve mechanically selects one of the fluid channels, and accordingly the hydraulic pressure outputted by the fail-safe switch valve establishes a corresponding one of the escape-related speed steps. Thus, even in the off-fail state, a driver can select, by operating the shift lever, a desired one of the plurality of escape-related speed steps, e.g., a desired one of a forward-run speed step and a rearward-run speed step, or a desired one of a high-speed-side speed step and a low-speed-side speed step, and accordingly can easily control the vehicle to escape.

(4) According to a fourth feature of the present invention that may be combined with any of the first to third features (1) to (3), the transmission-related solenoid valves comprise at least a first transmission-related solenoid valve which outputs the second hydraulic pressure to establish a low-speed-side speed step of the speed steps, and a second transmission-related solenoid valve which outputs the second hydraulic pressure to establish a high-speed-side speed step of the speed steps, and the hydraulic control apparatus further comprises a high-low switch valve which is provided between the fail-safe switch valve and each of the first and second transmission-related solenoid valves, and which is selectively switchable to a low-speed-side communication state thereof in which the high-low switch valve causes the fourth hydraulic pressure outputted from the at least one escape-related output port of the fail-safe switch valve, to be supplied to the drain port of the first transmission-related solenoid valve, and to a high-speed-side communication state thereof in which the high-low switch valve causes the fourth hydraulic pressure outputted from the at least one escape-related output port of the fail-safe switch valve, to be supplied to the drain port of the second transmission-related solenoid valve.

In the hydraulic control apparatus in accordance with the fourth feature (4), the high-low switch valve is selectively switchable to the low-speed-side communication state thereof, or to the high-speed-side communication state thereof, and accordingly the high-low switch valve selectively causes the hydraulic pressure outputted from the fail-safe switch valve, to be supplied to the first transmission-related solenoid valve to establish the low-speed-side speed step, or to be supplied to the second transmission-related solenoid valve to establish the high-speed-side speed step. Therefore, if the transmission-related solenoid valves fall in the off-fail state when the vehicle is running in any low-speed-side speed step, the hydraulic pressure is supplied to the first transmission-related solenoid valve; and if the transmission-related solenoid valves fall in the off-fail state when the vehicle is running in any high-speed-side speed step, the hydraulic pressure is supplied to the second transmission-related solenoid valve. Therefore, even when the transmission-related solenoid valves fall in the off-fail state, the speed steps can be prevented from being largely changed or shifted, and the driving force to drive or run the vehicle can be prevented from being largely changed.

(5) According to a fifth feature of the present invention that may be combined with the fourth feature (4), the second transmission-related solenoid valve outputs the second hydraulic pressure to one of the hydraulically operated frictional coupling devices so as to establish each one of a plurality of the high-speed-side speed steps, and the high-low switch valve receives, as a high-speed-side signal pressure, the second hydraulic pressure to cause the engaging of the one hydraulically operated frictional coupling device, and is mechanically switched, when receiving the high-speed-side signal pressure, from the low-speed-side communication state thereof to the high-speed-side communication state thereof, and is mechanically switched, when receiving of the high-speed-side signal pressure is stopped, from the high-speed-side communication state thereof to the low-speed-side communication state thereof.

In the hydraulic control apparatus in accordance with the fifth feature (5), the high-low switch valve receives, as the high-speed-side signal pressure, the hydraulic pressure that is outputted by the second transmission-related solenoid valve to cause the engaging of the high-speed-side hydraulically operated frictional coupling device and thereby establish each one of the plurality of high-speed-side speed steps. Depending upon the presence or absence of the high-speed-side signal pressure, the high-low switch valve is mechanically moved to the low-pressure-side communication position thereof or the high-pressure-side communication position thereof. Therefore, even when a failure, such as stopping of supplying of electric power caused by, e.g., disconnecting of a connector, may occur, an appropriate speed step can be established depending upon whether the vehicle is running in a high-speed-side speed step or a low-speed-side speed step.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

BEST MODE FOR CARRYING OUT THE PRESENT INVENTION

Figures 1A, 1B:
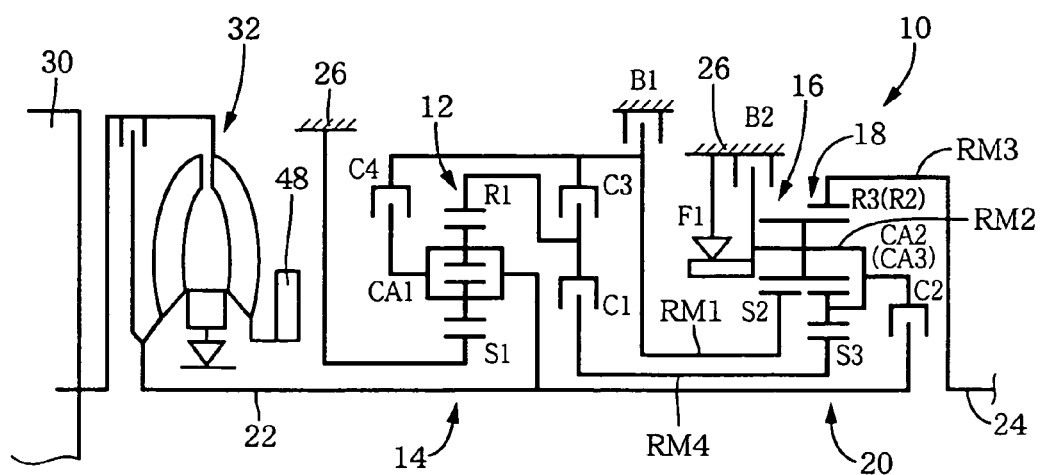
FIG. 1A is a schematic view for explaining an automatic transmission of a vehicle to which the present invention is applied.
FIG. 1B is an operation table representing a relationship between a plurality of speed steps of the automatic transmission of FIG. 1A and a plurality of combinations of respective operating states of a plurality of engaging elements (i.e., a plurality of hydraulically operated frictional coupling devices) to establish the respective speed steps.

The hydraulic control apparatus in accordance with the present invention is preferably used with an automatic transmission of a planetary gear type that includes a plurality of planetary gear sets. However, the hydraulic control apparatus may be used with an automatic transmission of a parallel axis type that has a plurality of input paths that are switchable with each other, or various other sorts of automatic transmissions each of which changes speed by selectively engaging and releasing (disengaging) each of a plurality of hydraulically operated frictional coupling devices.

As each of the hydraulically operated frictional coupling devices, a multiple-plate type or a single-plate type clutch or brake that is engaged by a hydraulic actuator, or a belt type brake is widely employed. A fluid pump that supplies a hydraulic fluid (oil) to cause the engaging of each hydraulically operated frictional coupling device may be one that is driven by a vehicle-drive power source such as an engine to output the hydraulic fluid, or one that is driven by an exclusive electric motor provided separately from a vehicle-drive power source.

As each of the transmission-related solenoid valves, a linear solenoid valve is preferably employed. The linear solenoid valve includes a spool valve member; a feedback fluid chamber that is provided on the side of one of opposite movement ends of the spool valve member and receives an output hydraulic pressure of the linear solenoid valve; a spring that is provided on the side of the one movement end of the spool valve member; and a solenoid that is provided on the side of the other movement end of the spool valve member, and adjusts the output hydraulic pressure based on a balance of the output hydraulic pressure introduced to the feedback fluid chamber, a biasing force of the spring, and an electromagnetic force of the solenoid. However, an ON-OFF solenoid valve that adjusts an output hydraulic pressure according to a duty cycle control may be employed.

The term "off-fail state" means that each of the transmission-related solenoid valves cannot output a hydraulic pressure because the output and drain ports thereof are communicate with each other and the input port thereof is shut off. For example, normally-closed type solenoid valves fall in the off-fail state when so-called "solenoid-OFF" occurs, that is, supplying of an exciting current to all the solenoid valves is stopped because of, e.g., breaking of a wire, disconnecting of a connector, or stopping of supplying of electric power to an electronic control device. Also, normally-open type solenoid valves may fall in the off-fail state when all the solenoid valves become uncontrollable, because of, e.g., a failure of an electronic control device, in a state in which those solenoid valves are supplied with a maximum exciting current.

It is desirable, in view of responsiveness, and/or accuracy, of the control of hydraulic pressure, that a hydraulic control circuit including the hydraulically operated frictional coupling devices directly supply the output hydraulic pressure of each of the transmission-related solenoid valves to a hydraulic actuator (e.g., a hydraulic cylinder) of a corresponding one of the hydraulically operated frictional coupling devices. However, the hydraulic control circuit may be modified such that the output hydraulic pressure of each of the transmission-related solenoid valves is used to operate a corresponding one of a plurality of control valves to supply a hydraulic fluid to the hydraulic actuator of a corresponding one of the frictional coupling devices. Thus, the present invention is applicable to a case where the transmission-related solenoid valves fall in the off-fail state and accordingly the control valves cannot output the respective hydraulic pressure. In this case, a hydraulic pressure is supplied to the drain port of a transmission-related solenoid valve corresponding to the escape-related frictional coupling device, so that a control valve corresponding to the escape-related frictional coupling device may be operated to supply the hydraulic pressure to the hydraulic actuator of the escape-related frictional coupling device and thereby cause the engaging of the escape-related frictional coupling device.

The transmission-related solenoid valves may be provided such that the solenoid valves correspond, one by one, to the hydraulically operated frictional coupling devices, respectively. However, this manner is not essential. For example, in the case where the hydraulically operated frictional coupling devices include two or more frictional coupling devices that are not simultaneously controlled so as to be engaged or released, the transmission-related solenoid valves may include a common solenoid valve that correspond to the two or more frictional coupling devices.

The escape-related speed step may be one that is established by the engaging of a single escape-related frictional coupling device, or one that is established by the respective engaging of two or more escape-related frictional coupling devices. In the case where the respective engaging of the two or more escape-related frictional coupling devices is caused by respective transmission-related solenoid valves, the fail-safe switch valve is connected to each of all those solenoid valves, so as to be able to supply a hydraulic pressure to the each solenoid valve.

It is preferred that the fail-safe switch valve be constituted by a single valve. However, the fail-safe switch valve may be constituted by a plurality of valves. The fail-related valve switching device may be constituted by an ON-OFF solenoid valve such that when a solenoid of the ON-OFF solenoid valve is turned ON (i.e., is energized), the ON-OFF solenoid valve outputs a hydraulic pressure, or stops the outputting of hydraulic pressure, so as to switch the fail-safe switch valve to the normal communication state thereof and, when the solenoid is turned OFF (i.e., is deenergized), the ON-OFF solenoid valve stops the outputting of hydraulic pressure, or outputs the hydraulic pressure, so as to switch the fail-safe switch valve to the fail-related communication state thereof. The fail-safe switch valve may employ, as needed, a biasing member or device such as a spring that is for switching the fail-safe switch valve between the normal and fail-related communication states thereof.

A failure of an electric system, such as disconnecting of a connector, would be a most probable cause of the off-fail state of all the transmission-related solenoid valves. Hence, it is preferred that the fail-related valve switching device be constructed such that when an electric power is supplied to the switching valve, the switching valve switches the fail-safe switch valve to the normal communication state thereof and, when the supplying of electric power is stopped, the switching valve switches the fail-safe switch valve to the fail-related communication state thereof. To this end, a solenoid is preferably employed by the fail-related valve switching device. However, it is possible to utilize a different sort of electric driving force so as to hold the fail-safe switch valve at the normal communication state thereof.

The fail-safe switch valve may be constituted by an ON-OFF solenoid valve such that when a solenoid of the ON-OFF solenoid valve is turned ON (i.e., is energized), the ON-OFF solenoid valve is switched to the normal communication state thereof and, when the solenoid is turned OFF (i.e., is deenergized), the ON-OFF solenoid valve is switched to the fail-related communication state thereof owing to a biasing device or member such as a spring.

The escape-related speed step or steps may be a single speed step for a forward running of the vehicle, or may be two speed steps, one for the forward running and the other for a rearward running of the vehicle. In the latter case, it is possible to employ a manual valve that is mechanically switched, by an operation of, e.g., a shift lever, to a first position where the manual valve outputs a forward-run hydraulic pressure to establish the speed step for the forward running of the vehicle, and a second position where the manual valve outputs a rearward-run hydraulic pressure to establish the speed step for the rearward running of the vehicle. Alternatively, the escape-related speed steps may be a plurality of speed steps that are all for the forward running of the vehicle but have different speed ratios; for example, a low-speed-side speed step having a great speed ratio and a high-speed-side speed step having a small speed ratio. In the last case, it is possible to employ a manual valve that is operated by, e.g., a shift lever to select an arbitrary one of a plurality of hydraulic circuits corresponding the plurality of speed steps, respectively.

In the case where each of two or more speed steps can be established as the escape-related speed step, it is possible to employ two or more fail-safe switch valves corresponding to the two or more escape-related speed steps, respectively. Alternatively, it is possible to employ such a single fail-safe switch valve that has two or more escape-related input ports each of which receives a hydraulic pressure from a corresponding one of the hydraulic circuits that is selected by the manual valve; and two or more escape-related output ports that are respectively connected to two or more transmission-related solenoid valves corresponding to the two or more escape-related speed steps, respectively.

In order that the vehicle can exhibit a certain degree of running capability, it is desirable that the escape-related speed step or steps be a low-speed-side speed step or steps having a considerably great speed ratio or ratios. However, if a low-speed-side speed step having a great speed ratio is immediately established as the escape-related speed step when the vehicle running at a high speed falls in the off-fail state, then a driving-power-source brake (e.g., an engine brake) may be abruptly strengthened. To avoid this problem, it is desirable to employ, as one of the escape-related speed steps, a high-speed-side speed step having a small speed ratio. In the latter case, it is possible to provide a high-low switch valve between the fail-safe switch valve and the drain port of each of the transmission-related solenoid valves corresponding to the low-speed-side and high-speed-side speed steps, respectively. The high-low switch valve is constructed such that it automatically and selectively supplies a hydraulic pressure to an appropriate one of the above-indicated transmission-related solenoid valves, according to the current speed step of the automatic transmission (i.e., when the off-fail state occurs), such that when the vehicle runs at a high speed, the high-speed-side speed step is established as the escape-related speed step and, when the vehicle runs at a low speed, the low-speed-side speed step is established as the escape-related speed step.

The above-indicated high-low switch valve may be one that is electrically operated according to an electric signal. However, in order that the high-low switch valve can be operated even when the supplying of electric power thereto is stopped, it is desirable that the high-low switch valve be one that is mechanically operated to establish selectively the low-speed-side speed step or the high-speed-side speed step. To this end, the high-low switch valve may be constructed to receive, as a signal pressure or pressures (i.e., a pilot pressure or pressures), either one, or both, of respective engaging-causing hydraulic pressures to cause the respective engaging of the escape-related frictional coupling devices to establish the low-speed-side and high-speed-side speed steps. In the case where respective output hydraulic pressures of the transmission-related solenoid valves are directly supplied to the respective hydraulic actuators (e.g., respective hydraulic cylinders) of the escape-related frictional coupling devices, the respective output hydraulic pressures are substantially equal to the above-indicated respective engaging-causing hydraulic pressures. On the other hand, in the case where the respective output hydraulic pressures are used to operate the respective control valves to supply the hydraulic fluid to the respective hydraulic actuators and thereby cause the respective engaging of the escape-related frictional coupling devices, the high-low switch valve may receive, as the signal pressures, the respective output hydraulic pressures of the transmission-related solenoid valves, in place of the above-indicated respective engaging-causing hydraulic pressures.

EMBODIMENT OF THE PRESENT INVENTION

Hereinafter, there will be described embodiments of the present invention by reference to the drawings. FIG. 1A is a schematic view of a vehicle automatic transmission 10 to which the present invention is applied; and FIG. 1B is an operation table representing a relationship between a plurality of speed steps (i.e., a parking position "P", a neutral position "N", first and second reverse-run speed steps "Rev1", "Rev2", and first to eighth forward-run speed steps "$1^{st}$" through "$8^{th}$"), and respective operating states of engaging elements (i.e., first to fourth clutches C1 through C4, two brakes B1, B2, and a one-way clutch F1). The automatic transmission 10 is preferably employed by an FR (front-engine, rear-drive) vehicle wherein the transmission 10 is set along a longitudinal axis of the vehicle. The automatic transmission 10 includes a first transmission portion 14 which is essentially constituted by a first planetary gear set 12 of a double-pinion type, and a second transmission portion 20 which is essentially constituted by a second planetary gear set 16 of a double-pinion type and a third planetary gear set 18 of a single-pinion type. The first and second transmission portions 14, 20 are provided on a common axis line. The automatic transmission 10 changes a rotation speed of an input shaft 24 as an input member, so that an output shaft 24 as an output member is rotated at the thus changed rotation speed. The input shaft 24 is an axis of a turbine of a torque converter 32 that is driven or rotated by an engine 30 as a power source to drive or run the vehicle. The output shaft 24 drives left and right drive wheels, not shown, of the vehicle via a propeller shaft or a differential gear unit, not shown. The automatic transmission 10 is substantially symmetrical with respect to its horizontal centerline, and a lower half portion of the transmission 10 located below the centerline is not shown in FIG. 1A The first planetary gear set 12 constituting the first transmission portion 14 includes three rotary elements, i.e., a sun gear S1, a carrier CA1, and a ring gear R1. The sun gear S1 is fixed to a transmission case 32 (hereinafter, simply referred to as the "case 32") such that the sun gear S1 is not rotatable about its axis line. The carrier CA1 is integrally connected to the input shaft 22 and is driven or rotated by the same 22, so that the ring gear R1 functions as a speed-decrease output member whose rotation speed is decreased as compared with the rotation speed of the input shaft 24 and is outputted to the second transmission portion 20. The second and third planetary gear sets 16, 18 which cooperate with each other to constitute the second transmission portion 20 are partly connected to each other, so as to provide four rotary elements RM1, RM2, RM3, RM4. More specifically described, a sun gear S2 of the second planetary gear set 16 provides the first rotary element RM1; respective carriers CA2, CA3 of the second and third planetary gear sets 16, 18 are connected to each other to provide the second rotary element RM2; respective ring gears R2, R3 of the second and third planetary gear sets 16, 18 are connected to each other to provide the third rotary element RM3; and a sun gear S3 of the third planetary gear set 18 provides the fourth rotary element RM4. The second and third planetary gear sets 16, 18 cooperate with each other to provide a Ravigneaux-type planetary gear set wherein the carriers CA2, CA3 are constituted by a common member; the ring gears R2, R3 are constituted by a common member; and a pinion gear of the second planetary gear set 16 also functions as a second pinion gear of the third planetary gear set 18.

The first rotary element RM1 (i.e., the sun gear S2) is selectively connected, by a first brake B1, to the case 26, so that the first rotary element RM1 is stopped from rotation; the second rotary element RM2 (the carriers CA2, CA3) is selectively connected, by a second brake B2, to the case 26, so that the second rotary element RM2 is stopped from rotation; the fourth rotary element RM4 (the sun gear S3) is selectively connected, by a first clutch C1, to the ring gear R1 of the first planetary gear set 12, i.e., the speed-decrease output member; the second rotary element RM2 (the carriers CA2, CA3) is selectively connected, by a second clutch C2, to the input shaft 22; the first rotary element RM1 (the sun gear S2) is selectively connected, by a third clutch C3, to the ring gear R1 as the speed-decrease output member, and is selectively connected, by a fourth clutch C4, to the carrier CA1 of the first planetary gear set 12, i.e., the input shaft 22; and the third rotary element RM3 (the ring gears R2, R2) is integrally connected to the output shaft 24 so as to output the rotation. In addition, between the second rotary element RM2 (the carriers CA2, CA3) and the case 26, there is provided, in parallel with the second brake B2, a one-way clutch F1 which allows a rotation of the second rotary element RM2 in a forward direction in which the input shaft 22 is rotated, and inhibits a rotation of the same RM2 in the reverse direction.

Figure 2:
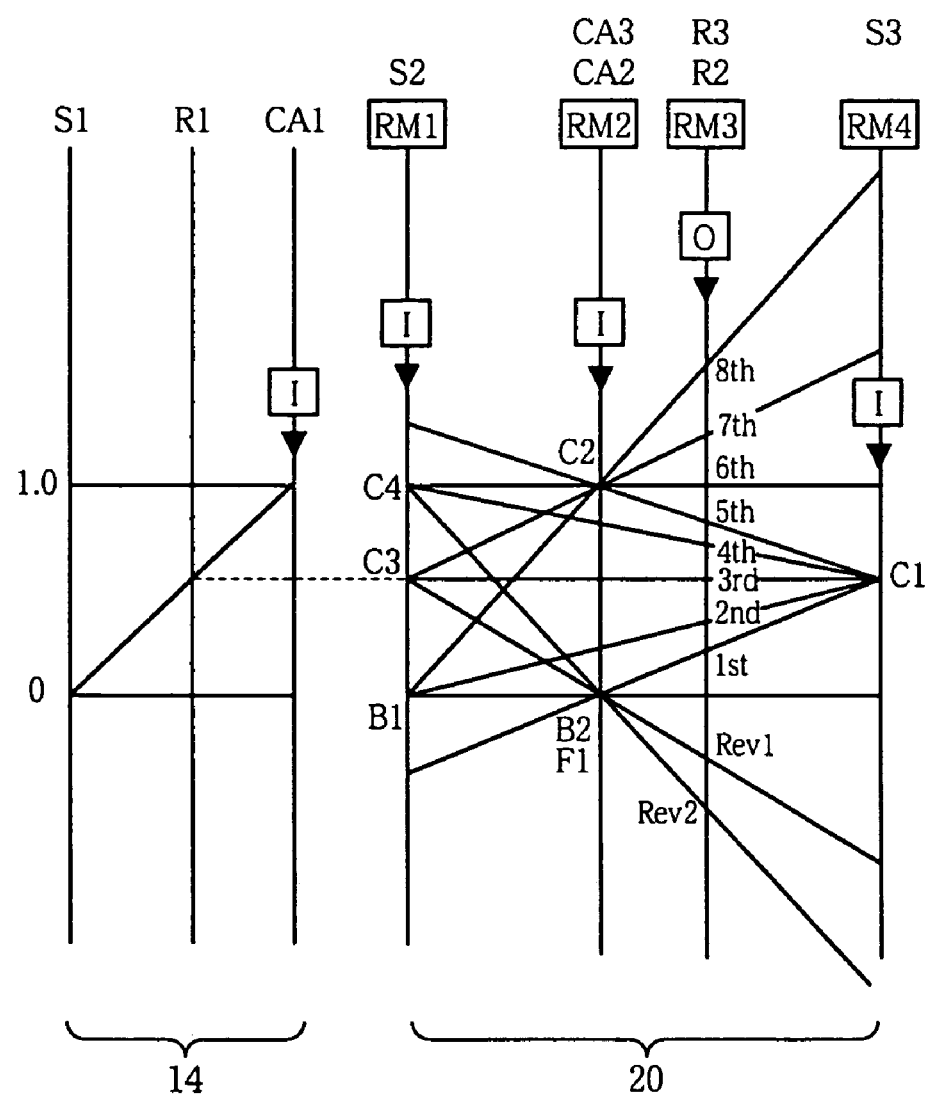
FIG. 2 is a collinear chart showing a plurality of straight lines each of which represents respective rotation speeds of a plurality of rotary elements in a corresponding one of the speed steps of the automatic transmission of FIG. 1A.

FIG. 2 is a collinear chart showing a plurality of straight lines each of which represents, in a corresponding one of the speed steps, respective relative rotation speeds of the respective rotary elements of the first and second transmission portions 14, 20. A lower horizontal straight line indicates a rotation speed of "0", and an upper horizontal straight line indicates a relative rotational speed of "1.0", i.e., the rotation speed of the input shaft 22. Three vertical lines for the first transmission portion 14 represent the sun gear S1, the ring gear R1, and the carrier CA1, respectively, in the order from the left to the right. Distances between adjacent ones of the three vertical lines are defined by a gear ratio ρ1 {=(number of teeth of sun gear S1)/(number of teeth of ring gear R1)} of the first planetary gear set 12. Four vertical lines for the second transmission portion 20 represent the first rotary element RM1 (the sun gear S2), the second rotary element RM2 (the carriers CA2, CA3), the third rotary element RM3 (the ring gears R2, R3), and the fourth rotary element RM4 (the sun gear S3), respectively, in the order from the left to the right. Distances between adjacent ones of the four vertical lines are defined by a gear ratio ρ2 of the second planetary gear set 16 and a gear ratio ρ3 of the third planetary gear set 18.

As is apparent from the collinear chart of FIG. 2, when the first clutch C1 and the second brake B2 are operated or engaged (indicated at symbols "○" in FIG. 1B), the fourth rotary element RM4 is rotated at a decreased speed, as an integral unit with the ring gear R1 as the speed-decrease output member, and the second rotary element RM2 is stopped from rotation, so that the third rotary element RM3 connected to the output shaft 24 is rotated at a speed indicated at "$1^{st}$" (FIG. 2), so as to establish a first forward-run speed step "$1^{st}$" (FIG. 1B) having the greatest speed ratio {=(rotation speed of input shaft 22)/(rotation speed of output shaft 24)}. When the first clutch C1 and the first brake B1 are engaged, the fourth rotary element RM4 is rotated at the decreased speed as the integral unit with the ring gear R1, and the first rotary element RM1 is stopped from rotation, so that the third rotary element RM3 is rotated at a speed indicated at "$2^{nd}$", so as to establish a second forward-run speed step "$2^{nd}$" having a speed ratio smaller than that of the first forward-run speed step "$1^{st}$". When the first clutch C1 and the third clutch C3 are engaged, the second transmission portion 20 is rotated at the decreased speed as the integral unit with the ring gear R1, so that the third rotary element RM3 is rotated at a speed indicated at "$3^{rd}$", i.e., the same speed as the rotation speed of the ring gear R1, so as to establish a third forward-run speed step "$3^{rd}$" having a speed ratio smaller than that of the second forward-run speed step "$2^{nd}$". When the first clutch C1 and the fourth clutch C4 are engaged, the fourth rotary element RM4 is rotated at the decreased speed as the integral unit with-the ring gear R1, and the first rotary element RM1 is rotated as an integral unit with the input shaft 22, so that the third rotary element RM3 is rotated at a speed indicated at "$4^{th}$", so as to establish a fourth forward-run speed step "$4^{th}$" having a speed ratio smaller than that of the third forward-run speed step "$3^{rd}$". When the first clutch C1 and the second clutch C2 are engaged, the fourth rotary element RM4 is rotated at the decreased speed as the integral unit with the ring gear R1, and the second rotary element RM2 is rotated as an integral unit with the input shaft 22, so that the third rotary element RM3 is rotated at a speed indicated at "$5^{th}$", so as to establish a fifth forward-run speed step "$5^{th}$" having a speed ratio smaller than that of the fourth forward-run speed step "$4^{th}$".

In addition, when the second clutch C2 and the fourth clutch C4 are engaged, the second transmission portion 20 is rotated as an integral unit with the input shaft 22, so that the third rotary element RM3 is rotated at a speed indicated at "$6^{th}$", i.e., the same speed as the rotation speed of the input shaft 22, so as to establish a sixth forward-run speed step "$6^{th}$" having a speed ratio smaller than that of the fifth forward-run speed step "$5^{th}$". The speed ratio of the sixth speed step "$6^{th}$" is 1 (one). When the second clutch C2 and the third clutch C3 are engaged, the second transmission portion 20 is rotated as the integral unit with the input shaft 22, and the first rotary element RE1 is rotated at the decreased speed as an integral unit with the ring gear R1, so that the third rotary element RM3 is rotated at a speed indicated at "$7^{th}$", so as to establish a seventh forward-run speed step "$7^{th}$" having a speed ratio smaller than that of the sixth forward-run speed step "$6^{th}$". When the second clutch C2 and the first brake B1 are engaged, the second rotary element RM2 is rotated as an integral unit with the input shaft 22, and the first rotary element RE1 is stopped from rotation, so that the third rotary element RM3 is rotated at a speed indicated at "$8^{th}$", so as to establish an eighth forward-run speed step "$8^{th}$" having a speed ratio smaller than that of the seventh forward-run speed step "$7^{th}$".

Meanwhile, when the second brake B2 and the third clutch C3 are engaged, the second rotary element RE2 is stopped from rotation, and the first rotary element RM1 is rotated at the decreased speed as an integral unit with the ring gear R1, so that the third rotary element RM3 is rotated in the reverse direction at a speed indicated at "Rev1", so as to establish a first reverse speed step "Rev1". And, when the second brake B2 and the fourth clutch C4 are engaged, the second rotary element RE2 is stopped from rotation, and the first rotary element RM1 is rotated as an integral unit with the input shaft 22, so that the third rotary element RM3 is rotated in the reverse direction at a speed indicated at "Rev2", so as to establish a second reverse speed step "Rev2".

The operation table of FIG. 1B represents the relationship between the above-described speed steps of the automatic transmission 10 and the combinations of respective operating states of the four clutches C1, C2, C3, C4 and the two brakes B1, B2, and symbol "○" indicates an engaged state of each of the engaging elements C1 through C4, B1, B2; symbol "(○)" indicates an engaged stated of the second brake B2 only when an engine brake is effected; and blank indicates a released (disengaged) state of the each engaging element. Since the one-way clutch F1 is provided in parallel with the second brake B2 used to establish the first speed step "$1^{st}$", it is not needed to cause the second brake B2 to be engaged when the vehicle is started, i.e., accelerated. The respective speed ratios of the speed steps, shown in the operation table, depend on the respective gear ratios ρ1, ρ2, ρ3 of the first, second, and third planetary gear sets 12, 16, 18.

Each of the first through fourth clutches C1 through C4 and the first and second brakes B1, B2, i.e., the six engaging elements is a hydraulically operated frictional coupling device that includes a plurality of friction plates and is selectively engaged or released by a hydraulic actuator. Hereinafter, the first through fourth clutches C1 through C4 will be referred to as the "clutches C", and the first and second brakes B1, B2 will be referred to as the "brakes B", where it is not needed to distinguish them from each other. The six engaging elements C1 through C4, B1, B2 are supplied with respective hydraulic pressures from six linear solenoid valves SL1, SL2, SL3, SL4, SL5, SL6 of a hydraulic control circuit 98, shown in FIG. 3. Thus, each of the clutches C and the brakes B is selectively engaged or released, and a transitional hydraulic pressure supplied to the each engaging element C, B is controlled by energizing or deenergizing, or controlling an electric current supplied to, a corresponding one of the linear solenoid valves SL1 through SL6. FIG. 4 shows only a portion of the hydraulic control circuit 98 that is related to the six linear solenoid valves SL1 through SL6. The six linear solenoid valves SL1 through SL6 each adjust a line hydraulic pressure PL outputted by a hydraulic pressure supplying device 46, and directly supply the thus adjusted hydraulic pressure to respective hydraulic actuators (e.g., respective hydraulic cylinders) 34, 36, 38, 40, 42, 44 of the four clutches C and the two brakes B. The hydraulic pressure supplying device 46 includes a mechanical oil pump 48 that is driven or rotated by the engine 30; and a regulator valve that produces the line hydraulic pressure PL, and the supplying device 46 controls the line pressure PL according to, e.g., an engine load.

Figure 5:
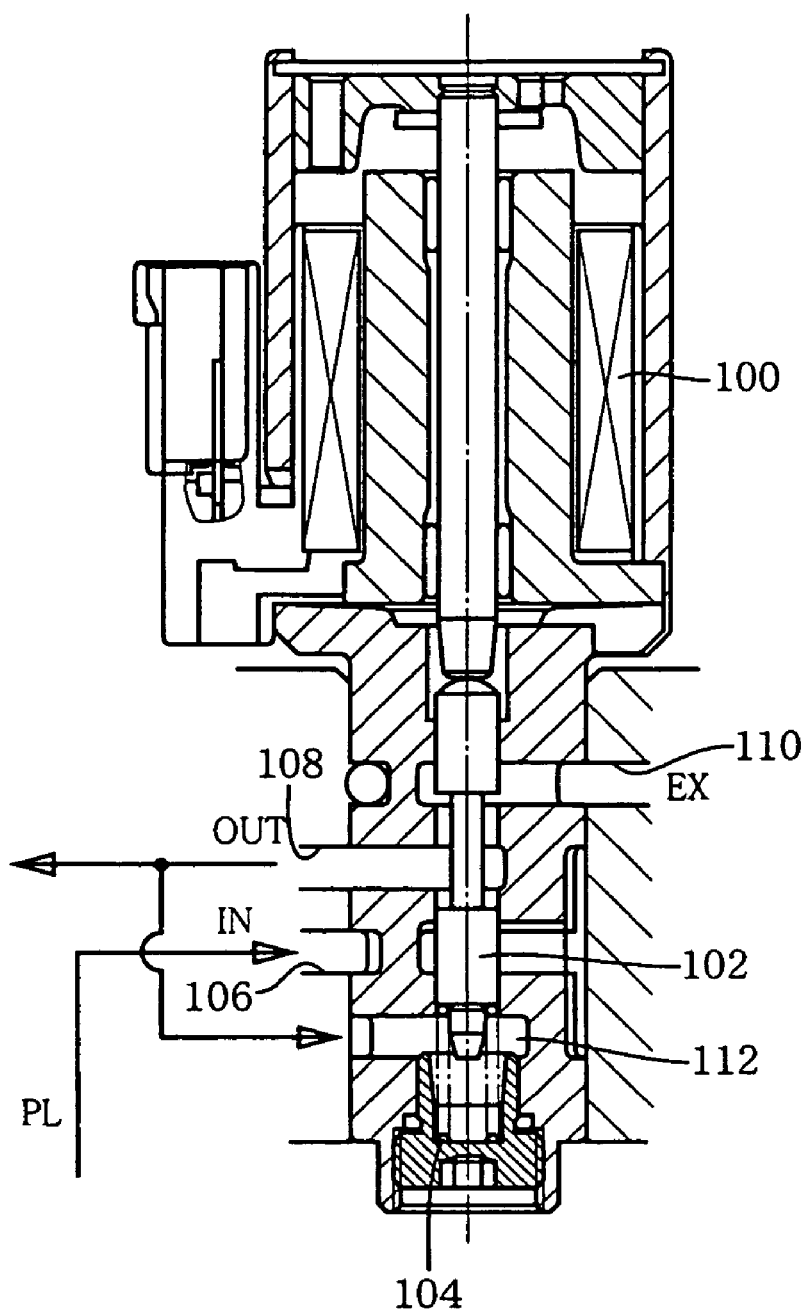
FIG. 5 is a cross-section view of one of a plurality of linear solenoid valves of the hydraulic control circuit of FIG. 4.

Each of the six linear solenoid valves SL1 through SL6 corresponds to a transmission-related solenoid valve. The six linear solenoid valves SL1 through SL6 have a basically identical construction. In the present embodiment, each linear solenoid valve SL1 through SL6 is of a normally closed type. As shown in FIG. 5, each linear solenoid valve SL1 through SL6 includes a solenoid 100 that produces an electromagnetic force F corresponding to an energizing (exciting) current supplied thereto; a spool valve member 102; a spring 104; an input port (IN) 106 to which the line hydraulic pressure PL is supplied; an output port (OUT) 108 from which an adjusted hydraulic pressure is outputted; a drain port (EX) 110; and a feedback chamber 112 to which a portion of the output hydraulic pressure is supplied as a feedback hydraulic pressure Pf. Each linear solenoid valve SL1 through SL6 supplies the output hydraulic pressure (equal to the feedback hydraulic pressure Pf), to a corresponding one of the six hydraulic actuators 34 through 44, while controlling or adjusting the output hydraulic pressure by changing respective communicated or shut-off states of the three ports 106, 108, 110 according to the electromagnetic force F of the solenoid 100, so that the feedback pressure Pf, an area Af to receive the feedback pressure Pf, a load Fs of the spring 104, and the electromagnetic force F of the solenoid 100 satisfy the following expression (1):

$$F = Pf \times Af + Fs \tag{1}$$

The solenoid 100 of each one of the linear solenoid valves SL1 through SL6 can be energized (excited), by an electronic control device 90, independent of the respective solenoids 100 of the other linear solenoid valves.

While the linear solenoid valves SL1 through SL6 are supplied with the respective energizing currents from the electronic control device 90, the linear solenoid valves adjust the respective output hydraulic pressures, in the state in which each of the linear solenoid valves is balanced to satisfy the expression (1). However, when the supplying of the energizing currents is stopped and the respective solenoids 100 of the linear solenoid valves SL1 through SL6 are turned OFF, i.e., the solenoids 100 are deenergized, the spool valve member 102 of each of the solenoid valves SL1 through SL6 is held, as shown in FIG. 5, at a movement-end position thereof on the side of the corresponding solenoid 100, owing to the load Fs of the corresponding spring 104, and the corresponding input port 106 is substantially completely shut off. In addition, the corresponding output port 108 is caused to communicate with the corresponding drain port 110, so that the output hydraulic pressure becomes zero and a corresponding one of the clutches C and the brakes B is released.

Figure 3:
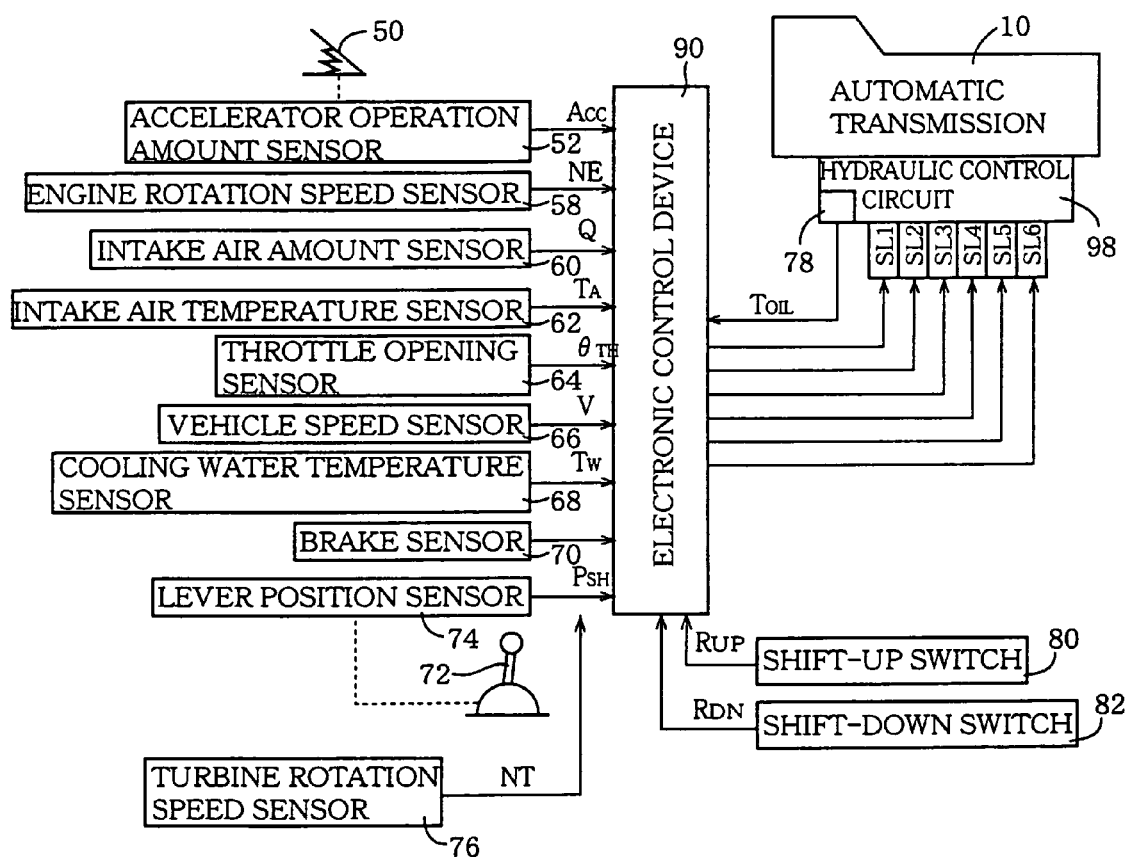
FIG. 3 is a diagrammatic view for explaining a relevant portion of a control system for use with the automatic transmission of FIG. 1A.
Figure 4:
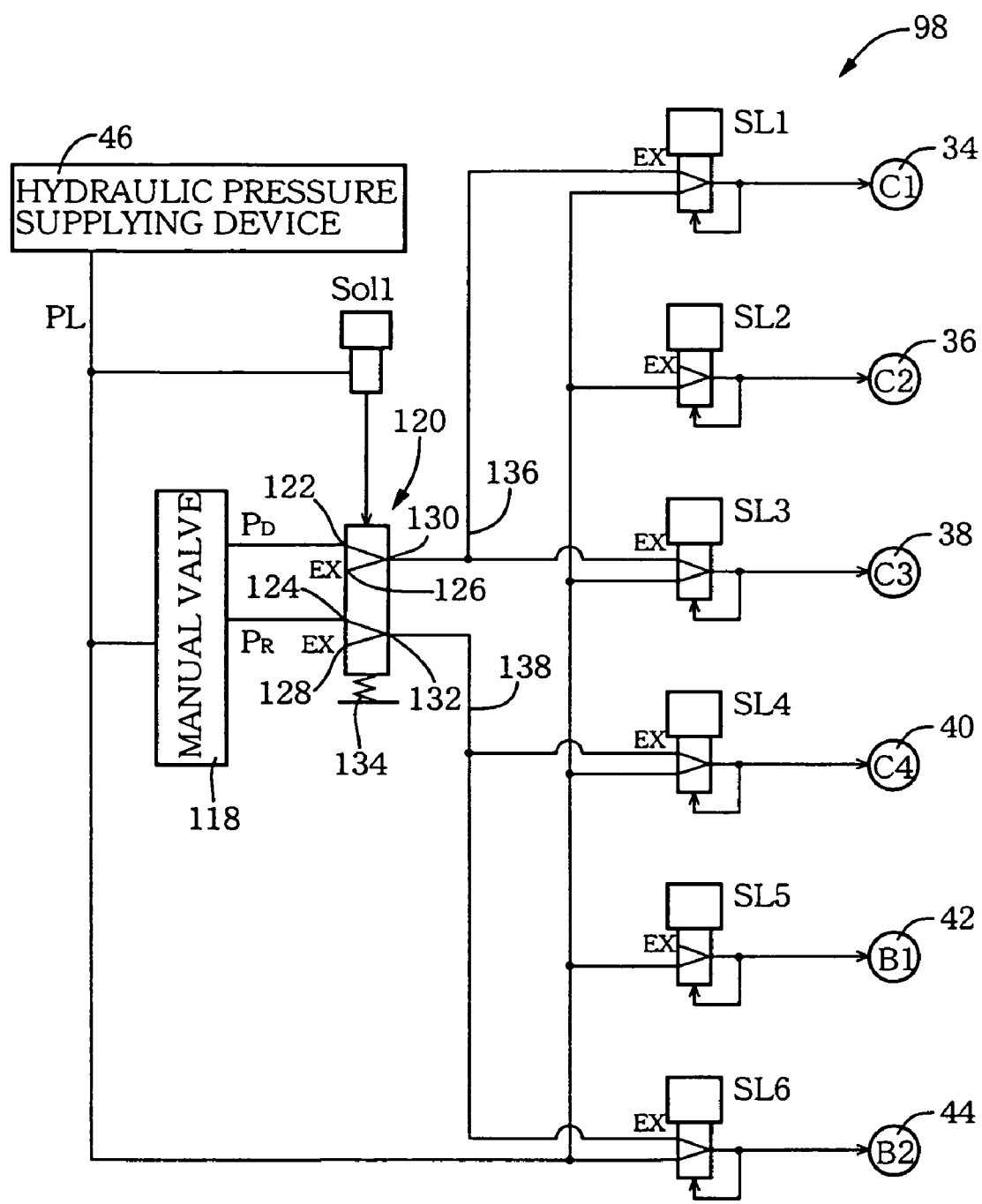
FIG. 4 is a diagrammatic view for explaining a relevant portion of a hydraulic control circuit of the control system of FIG. 3.

FIG. 3 is a diagrammatic view for explaining a control system that is employed by the vehicle to control the automatic transmission 10, etc, shown in FIG. 1. The control system includes an accelerator operation amount sensor 52 which detects an amount Acc of operation of an accelerator pedal 50, and supplies an electric signal representing the detected accelerator operation amount Acc, to the electronic control device 90. The accelerator pedal 50 is operated or depressed by a driver's foot, by an amount corresponding to his or her desired output amount. Thus, the accelerator pedal 50 corresponds to an accelerator operating member, and the accelerator operation amount Acc corresponds to the desired output amount. The control system additionally includes an engine rotation speed sensor 58 which detects a rotation speed NE of the engine 30; an intake air amount sensor 60 which detects an amount Q of air taken by the engine 30; an intake air temperature sensor 62 which detects a temperature $T_A$ of the air taken by the engine 30; a throttle sensor 64 with an idling switch that detects a fully closed state of an electronic throttle valve of the engine 30 (i.e., an idling state of the engine 30) and a throttle opening $\Theta_{TH}$ of the throttle valve; a vehicle speed sensor 66 which detects a running speed V of the vehicle that corresponds to a rotation speed $N_{OUT}$ of the output shaft 24; a cooling water temperature sensor 68 which detects a temperature $T_W$ of a cooling water to cool the engine 30; a brake switch 70 which detects whether a foot brake as a service brake is being operated or not; a lever position sensor 74 which detects an operation position $P_{SH}$ of a shift lever 72; a turbine rotation speed sensor 76 which detects a turbine rotation speed NT (i.e., a rotation speed $N_{IN}$ of the input shaft 22); an AT oil temperature sensor 78 which detects an AT oil temperature $T_{OIL}$ as a temperature of a hydraulic fluid (oil) in the hydraulic control circuit 98; a shift-up switch 80 which is manually operable to input a shift-up command $R_{UP}$ to shift up the speed step of the automatic transmission 10; and a shift-down switch 82 which is manually operable to input a shift-down command $R_{DN}$ to shift down the speed step of the automatic transmission 10. These sensors and switches 52, 58, 60, 62, 64, 66, 68, 70, 74, 76, 78, 80, 82 supply, to the electronic control device 90, respective electric signals representing the engine rotation speed NE, the intake air amount Q, the intake air temperature $T_A$, the throttle opening $\Theta_{TH}$, the vehicle running speed V, the engine cooling water temperature $T_W$, whether the foot brake is being operated or not, the operation position $P_{SH}$ of the shift lever 72, the turbine rotation speed NT, the AT oil temperature $T_{OIL}$, the shift-up command $R_{UP}$, and the shift-down command $R_{DN}$.

Figure 6:
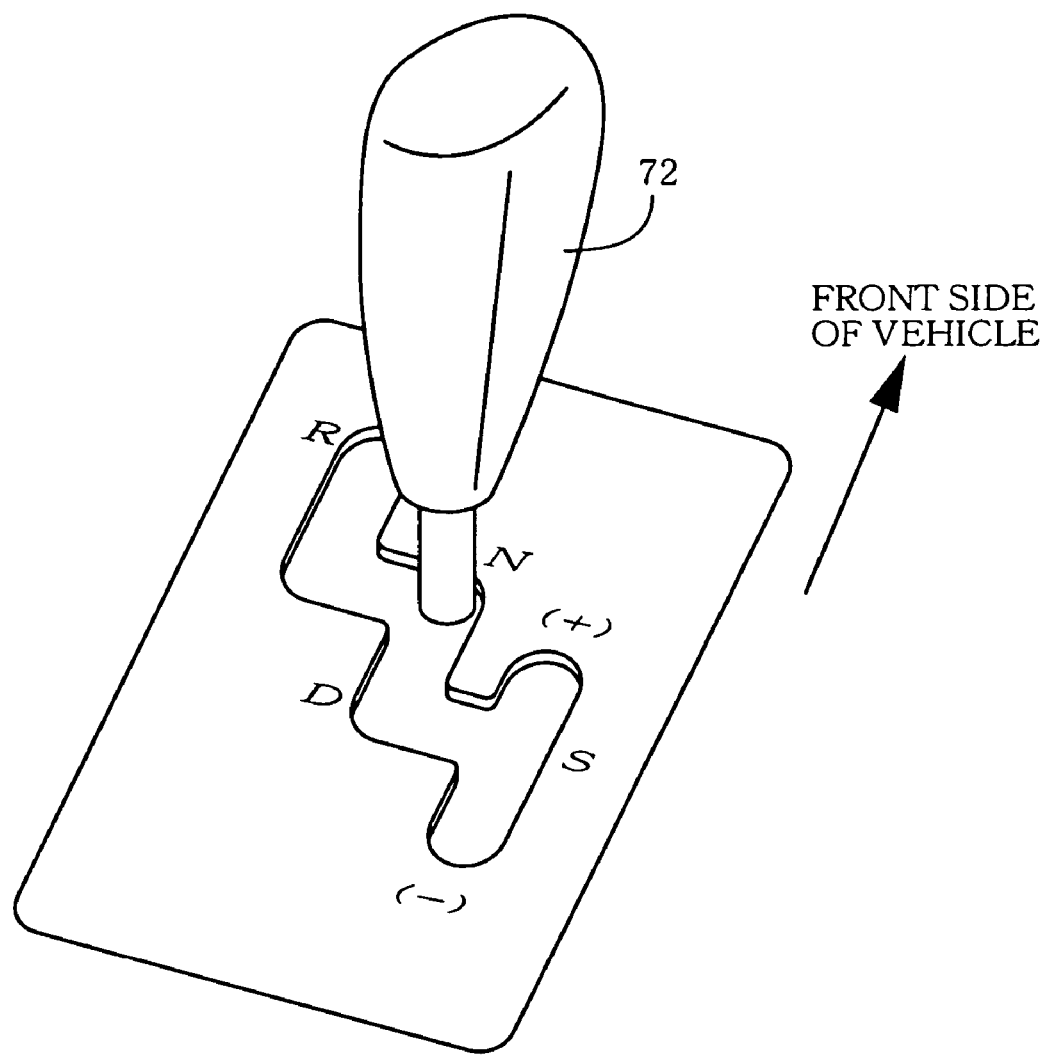
FIG. 6 is a perspective view of a shift lever as a portion of the control system of FIG. 3.

The shift lever 72 is provided in the vicinity of a driver's seat, and is manually operable by a driver to one of four operation positions, i.e., "R (reverse) position", "N (neutral) position", "D (drive) position", and "S (sequential) position", as shown in FIG. 6. The R position is a rearward running position; the N position is a power transmission stopping position; the D position is a forward running position in which automatic changing of the forward-run speed steps is carried out; and the S position is a forward running position in which manual changing of the forward-run speed steps can be carried out by selecting one of a plurality of speed change ranges having different highest speed steps. The current operation position of the shift lever 72 is detected by the above-described lever position sensor 74.

Figures 7, 8:
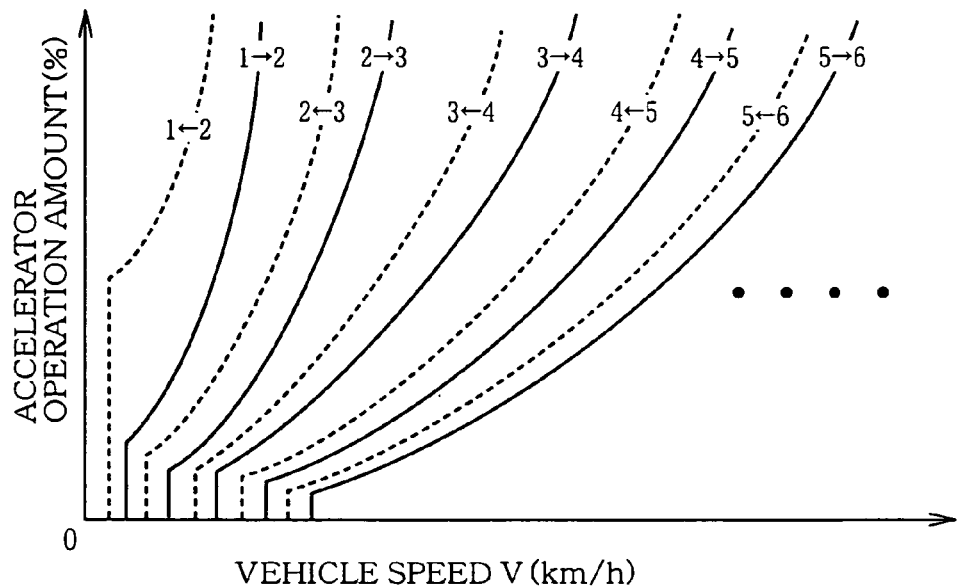
FIG. 7 is a graph showing a speed change map according to which the speed steps of the automatic transmission of FIG. 1A are automatically changed or shifted based on a current operating state of the vehicle.
FIG. 8 is a table for explaining a plurality of speed change ranges that can be changed by operating the shift lever of FIG. 6.

When the shift lever 72 is operated to the D position or the S position, the vehicle can run forward while the speed steps of the automatic transmission 10 can be changed among the first to eighth speed steps "$1^{st}$" through "$8^{th}$" each as a forward-run speed step, shown in the operation table of FIG. 2. More specifically described, when the shift lever 72 is moved to the D position, the electronic control device 90 recognizes this situation based on the signal supplied from the lever position sensor 74, and establishes an automatic speed change mode in which all the forward-run speed steps, i.e., the first to eighth speed steps "$1^{st}$" through "$8^{th}$" can be used to change the running speed V of the vehicle. That is, the energizing or deenergizing of each of the six linear solenoid valves SL1 through SL6 is controlled to switch the engaging or releasing of a corresponding one of the clutches C and the brakes B and thereby establish an appropriate one of the eight forward-run speed steps. This speed change control is carried out according to a pre-stored speed change map (i.e., a speed change condition), shown in FIG. 7, that is defined by two parameters, i.e., vehicle speed V and accelerator operation amount Acc. For example, as vehicle speed V decreases or as accelerator operation amount Acc increases, a lower speed step whose speed ratio is greater is selected. However, the speed change control may be carried out in various manners, e.g., may be carried out based on accelerator operation amount Acc and intake air amount Q and/or slope of road surface.

When the shift lever 72 is moved to the S position, the electronic control device 90 recognizes this situation based on the signal supplied from the lever position sensor 74, and electrically establishes a sequential mode in which the driver can select an arbitrary one of a plurality of speed change ranges each of which is pre-determined within all the speed steps that can be established in the D position, i.e., the first to eighth speed steps "$1^{st}$" through "$8^{th}$". The S position includes two selectable sub-positions that are arranged in a longitudinal direction of the vehicle, i.e., a shift-up position "+" and a shift-down position "−". When the shift lever 72 is operated to the shift-up position "+" or the shift-down position "−", the shift-up switch 80 or the shift-down switch 82 detects this situation and outputs the shift-up command $R_{UP}$ or the shift-down command $R_{DN}$. Based on the shift-up command $R_{UP}$ or the shift-down command $R_{DN}$, the electronic control device 90 electrically establishes an appropriate one of eight speed change ranges "D", "7", "6", "5", "4", "3", "2", "L", shown in FIG. 8, having different highest speed steps, i.e., having different smallest speed ratios. In each of the eight speed change ranges "D" through "L", the automatic speed change control is carried out according to the speed change map of FIG. 7. For example, if, on a downhill, the driver iteratively operates the shift lever 72 to the shift-down position "−", the speed change range is gradually shifted down from "4" to "3", "2", and "L", so that the speed step of the automatic transmission 10 is gradually shifted down from the fourth speed step "$4^{th}$" to the third speed step "$3^{rd}$", the second speed step "$2^{nd}$", and the first speed step "$1^{st}$" and accordingly the engine brake is gradually strengthened. In the first speed step "$1^{st}$" established in the sequential mode, the second brake B2 is engaged so as to apply the engine brake.

Each of the shift-up position "+" and the shift-down position "−" is unstable, and the shift lever 72 is biased by a biasing device such as a spring, so as to be automatically moved back to an intermediate position between the shift-up position "+" and the shift-down position "−" in the S position. The speed change ranges are changed based on the time(s) of operation of the shift lever 72 to the shift-up position "+" or the shift-down position "−", or the time duration in which the shift lever 72 is held at the shift-up position "+" or the shift-down position "−".

Here, if breaking of a wire or disconnecting of a connector occurs, or supplying of electric power to the electronic control device 90 is stopped, and accordingly all the linear solenoid valves SL1 through SL6 becomes uncontrollable and the respective solenoids 100 of the solenoid valves SL1 through SL6 are turned OFF, then the respective input ports 106 of the solenoid valves SL1 through SL6 are shut off and the respective output ports 108 thereof are communicated with the corresponding drain ports 110, so that the respective output pressures thereof become zero. This is the so-called "off-fail" state of the linear solenoid valves SL1 through SL6. Consequently all the clutches C and the brakes B are released (disengaged) and the automatic transmission 10 is placed in the neutral state thereof, so that the vehicle would otherwise become unable to run. In the present embodiment, however, even if the linear solenoid valves SL1 through SL6 may fall in the off-fail state, the hydraulic control circuit 98 can mechanically establish the third forward-run speed step "$3^{rd}$" or the second reverse (rearward-run) speed step "Rev2" each as an escape-related speed step, so that the vehicle is able to run, i.e., escape.

More specifically described, as shown in FIG. 4, a forward-run hydraulic pressure $P_D$ is supplied via a manual valve 118 and a sequence valve 120 to the respective drain ports 110 of the linear solenoid valves SL1, SL3 corresponding to the first and third clutches C1, C3 that are engaged when the third forward-run speed step "$3^{rd}$" is established. The forward-run hydraulic pressures $P_D$ are further supplied from the respective output ports 108 of the two linear solenoid valves SL1, SL3 to the respective hydraulic actuators 34, 38 of the first and third clutches C1, C3, so that the first and third clutches C1, C3 are engaged and the third forward-run speed step "$3^{rd}$" is established. In addition, a rearward-run hydraulic pressure $P_R$ is supplied via the manual valve 118 and the sequence valve 120 to the respective drain ports 110 of the linear solenoid valves SL4, SL6 corresponding to the fourth clutch C4 and the second brake B2 that are engaged when the second reverse speed step "Rev2" is established. The rearward-run hydraulic pressures $P_R$ are further supplied from the respective output ports 108 of the two linear solenoid valves SL4, SL6 to the respective hydraulic actuators 40, 44 of the fourth clutch C4 and the second brake B2, so that the fourth clutch C4 and the second brake B2 are engaged and the second reverse speed step "Rev2" is established. Thus, the first and third clutches C1, C3 used to establish the third forward-run speed step "$3^{rd}$" and the fourth clutch C4 and the second brake B2 used to establish the second reverse speed step "Rev2" correspond to escape-related frictional coupling devices.

The manual valve 118 is connected to the above-described shift lever 72 via a cable or a link and, when the shift lever 72 is operated in a frontward or rearward direction, the manual valve 118 mechanically switches oil flow channels. More specifically described, when the shift lever 72 is operated or moved to the R position corresponding to the rearward running of the vehicle, the manual valve 118 outputs the rearward-run hydraulic pressure $P_R$ and drains the forward-run hydraulic pressure $P_D$; and when the shift lever 72 is moved to the D or S position corresponding to the forward running of the vehicle, the manual valve 118 outputs the forward-run hydraulic pressure $P_D$ and drains the rearward-run hydraulic pressure $P_R$. In addition, when the shift lever 72 is moved to the N position, the manual valve 118 drains both the rearward-run hydraulic pressure $P_R$ and the forward-run hydraulic pressure $P_D$.

The above-indicated sequence valve 120 corresponds to a fail-safe switch valve. The sequence valve 120 has two escape-related input ports 122, 124 to which the above-described forward-run hydraulic pressure $P_D$ and rearward-run hydraulic pressure $P_R$ are supplied, respectively; two drain ports 126, 128 each of which drains the hydraulic fluid; and two escape-related output ports 130, 132. One 130 of the two escape-related output ports 130, 132 is connected via a fluid passage 136 to the respective drain ports 110 of the linear solenoid valves SL1, SL3; and the other escape-related output port 132 is connected via a fluid passage 138 to the respective drain ports 110 of the linear solenoid valves SL4, SL6. When a spool valve member, not shown, is moved, by a biasing force of a spring 134, to one of two movement-end positions thereof, the sequence valve 120 is switched to a fail-related communication state thereof in which the escape-related input and output ports 122, 130 are communicated with each other and the drain port 126 is shut off and simultaneously the escape-related input and output ports 124, 132 are communicated with each other and the drain port 128 is shut off. Thus, when the shift lever 72 is operated to the D position so that the vehicle may run forward, the forward-run hydraulic pressure $P_D$ outputted from the manual valve 118 is supplied via the sequence valve 120 to the respective drain ports 110 of the linear solenoid valves SL1, SL3, and is subsequently supplied to the hydraulic actuators 34, 38 so that the first and third clutches C1, C3 are engaged and the third speed step "$3^{rd}$" is established. In addition, when the shift lever 72 is operated to the R position so that the vehicle may run rearward, the rearward-run hydraulic pressure $P_R$ outputted from the manual valve 118 is supplied via the sequence valve 120 to the respective drain ports 110 of the linear solenoid valves SL4, SL6, and is subsequently supplied to the hydraulic actuators 40, 44 so that the fourth clutch C4 and the second brake B2 are engaged and the second reverse speed step "Rev2" is established.

An ON-OFF solenoid valve Sol1 is connected to the sequence valve 120. When a solenoid of the ON-OFF solenoid valve Sol1 is turned ON, i.e., energized by the electronic control device 90, the ON-OFF solenoid valve Sol1 supplies a signal pressure to the sequence valve 120. When the sequence valve 120 receives the signal pressure, the spool valve member of the sequence valve 120 is moved to the other of the two movement-end positions thereof against the biasing force of the spring 134. Thus, the sequence valve 120 is switched to a normal communication state thereof in which the escape-related output port 130 and the drain port 126 are communicated with each other and the escape-related input port 122 is shut off and simultaneously the escape-related output port 132 and the drain port 128 are communicated with each other and the escape-related input port 124 is shut off. Thus, the drain port 110 of each of the linear solenoid valves SL1, SL3, SL4, SL6 is communicated with a corresponding one of the drain ports 126, 128 of the sequence valve 120, so that the hydraulic fluid can be drained from the one drain port 126, 128. Thus, each of the linear solenoid valves SL1, SL3, SL4, SL6 can control the selective engaging and releasing of a corresponding one of the engaging elements (clutches and brake) C1, C3, C4, B2 and can control the transient hydraulic pressure supplied to the one engaging element.

The ON-OFF solenoid valve Sol1 corresponds to a fail-related valve switching device. Under a usual or normal condition, the electronic control device 90 keeps the solenoid of the ON-OFF solenoid valve Sol1 to an ON state thereof, so that the ON-OFF solenoid valve Sol1 outputs the signal pressure to the sequence valve 120, and the sequence valve 120 is held at the normal communication state thereof. However, if breaking of a wire or disconnecting of a connector occurs, or the supplying of electric power to the electronic control device 90 is stopped, and accordingly the solenoid of the ON-OFF solenoid valve Sol1 is turned OFF, i.e., deenergized, the ON-OFF solenoid valve Sol1 stops outputting the signal pressure to the sequence valve 120, and the sequence valve 120 is switched by the biasing force of the spring 134 to the fail-related communication state thereof. That is, if the breaking of wire or the disconnecting of connector occurs, or the supplying of electric power to the electronic control device 90 is stopped, and accordingly all the linear solenoid valves SL1 through SL6 fall in the so-called "off-fail" state, then the solenoid of the ON-OFF solenoid valve Sol1 is also turned OFF, so that the sequence valve 120 is switched to the fail-related communication state thereof. Therefore, depending upon the current operation position of the shift lever 72, the third forward-run speed step "$3^{rd}$" or the second reverse (rearward-run) speed step "Rev2" is mechanically established.

Thus, in the automatic transmission 10 of the vehicle, the sequence valve 120 is connected to the respective drain ports 110 of the linear solenoid valves SL1, SL3, SL4, SL6 corresponding to the clutches C1, C3, C4 and the brake B2 to establish the third forward-run speed step "$3^{rd}$" and the second reverse speed step "Rev2" each as the escape-related speed step. If all the linear solenoid valves SL1 through SL6 fall in the off-fail state in which the valves SL1 through SL6 cannot output the respective hydraulic pressures, then the solenoid of the ON-OFF solenoid valve Sol1 is also turned OFF, so that the sequence valve 120 is switched from the normal communication state thereof to the fail-related communication state thereof. Consequently the sequence valve 120 supplies the forward-run hydraulic pressure $P_D$ or the rearward-run hydraulic pressure $P_R$ to the respective drain ports 110 of the two linear solenoid valves SL1, SL3, or the respective drain ports 110 of the two linear solenoid valves SL4, SL6, and subsequently supplies, from the respective output ports 108 of the same, the forward-run or rearward-run hydraulic pressure $P_D$, $P_R$ to the two hydraulic actuators 34, 38, or the two hydraulic actuators 40, 44. Thus, depending upon the current operation position of the shift lever 72, the third forward-run speed step "$3^{rd}$" or the second reverse speed step "Rev2" is mechanically established, and the vehicle is allowed to run, i.e., escape.

The sequence valve 120 is connected to the respective drain ports 110 of the linear solenoid valves SL1, SL3, SL4, SL6, and supplies the hydraulic pressure to those drain ports 110. Therefore, under the usual or normal condition, the hydraulic pressure is directly supplied from the linear solenoid valves SL1, SL3, SL4, SL6 to the corresponding hydraulic actuators 34, 38, 40, 44, without flowing through the sequence valve 120. This arrangement contributes to preventing increasing an overall length of a fluid channel in which the hydraulic fluid flows between each of the linear solenoid valves SL1, SL3, SL4, SL6 and a corresponding one of the hydraulic actuators 34, 38, 40, 44. Thus, the responsiveness, and control accuracy, of each of the linear solenoid valves SL1, SL3, SL4, SL6 with respect to the hydraulic control thereof can be maintained.

In addition, in the illustrated embodiment, when the shift lever 72 is operated or moved, the manual valve 118 mechanically selects one of the two fluid channels through which the forward-run hydraulic pressure $P_D$ and the rearward-run hydraulic pressure $P_R$ are supplied, respectively, and accordingly the hydraulic pressure outputted by the sequence valve 120 establishes a corresponding one of the two escape-related speed steps. More specifically described, when the shift lever 72 is moved to the D position corresponding to the forward running of the vehicle, the third forward-run speed step "$3^{rd}$" is established; and when the shift lever 72 is moved to the R position corresponding to the rearward running of the vehicle, the second second speed step "Rev2" is established. Thus, even in the so-called "off-fail" state, the driver can select a desired one of the forward running and the rearward running by operating the shift lever 72, and accordingly can easily control the vehicle to run, i.e., escape.

Figure 9:
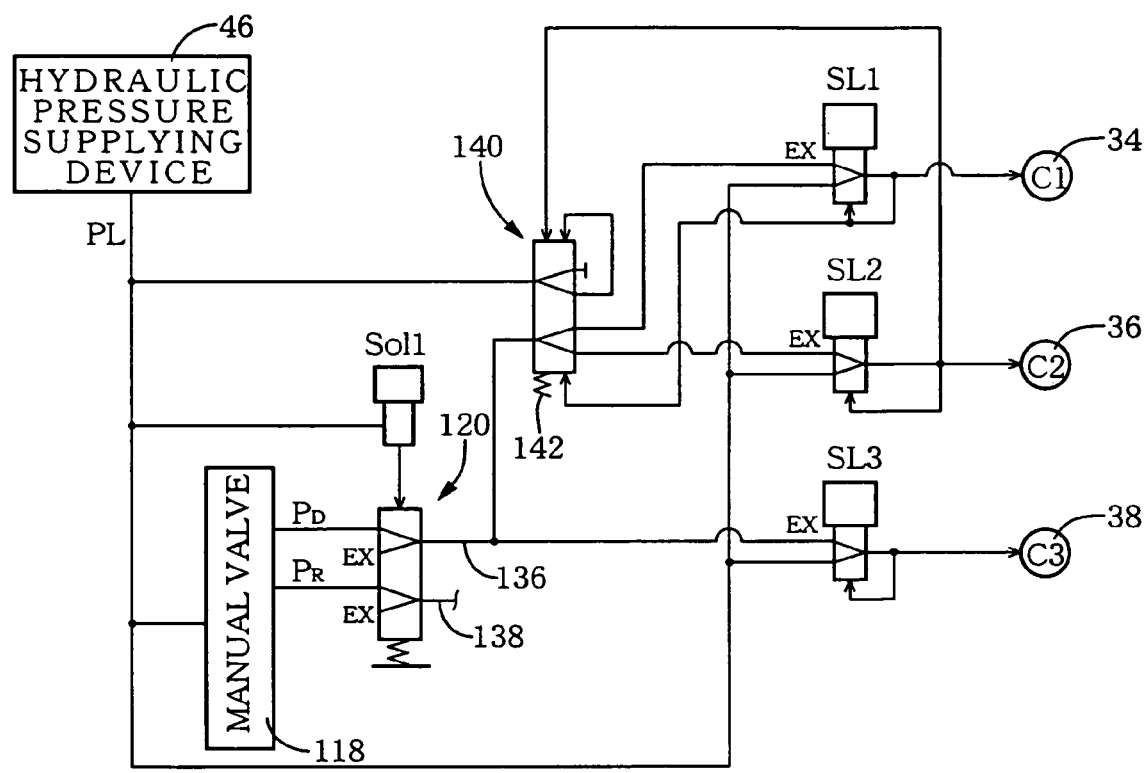
FIG. 9 is a schematic view corresponding to FIG. 4, for explaining a relevant portion of another hydraulic control circuit of another control system as a second embodiment of the present invention, the hydraulic control circuit including a high-low switch valve corresponding to forward-run speed steps.

In the above-described first embodiment, when the shift lever 72 is operated to the D or S position and the vehicle is running forward, the third speed step "$3^{rd}$" is established without any options. However, in a second embodiment shown in FIG. 9, a high-low switch valve 140 is employed to establish either the third speed step "$3^{rd}$" or the seventh speed step "$7^{th}$" depending upon the current speed step of the automatic transmission 10 when the vehicle falls in the so-called "off-fail" state. The high-low switch valve 140 is provided between the above-described fluid passage 136 and the linear solenoid valves SL1, SL2 corresponding to the first and second clutches C1, C2, respectively. The first clutch C1 is engaged to establish each of the low-speed-side speed steps not higher than the fifth speed steps "$5^{th}$"; and the second clutch C2 is engaged to establish each of the high-speed-side speed steps not lower than the fifth speed steps "$5^{th}$". The high-low switch valve 140 receives, as a low-speed-side signal pressure, the hydraulic pressure supplied to the first clutch C1, i.e., the output hydraulic pressure of the linear solenoid valve SL1 (i.e., the SL1 hydraulic pressure), and receives, as a high-speed-side signal pressure, the hydraulic pressure supplied to the second clutch C2, i.e., the output hydraulic pressure of the linear solenoid valve SL2 (i.e., the SL2 hydraulic pressure). The low-speed-side signal pressure and the high-speed-side signal pressure respectively act on opposite ends of a spool valve member, not shown, of the high-low switch valve 140. When a forward-run speed step not higher than the fourth speed step "$4^{th}$" is established, the SL1 hydraulic pressure and a biasing force of a spring 142 cooperate with each other to move the spool valve member toward a low-speed-side communication position thereof in which the high-low switch valve 140 connects the fluid passage 136 to the drain port 110 of the linear solenoid valve SL1. If, from this state, the linear solenoid valves SL1 through SL6 fall in the off-fail state, the biasing force of the spring 142 holds the spool valve member of the high-low switch valve 140 at the low-speed-side communication position thereof, so that the forward-run hydraulic pressure $P_D$ is supplied from the fluid passage 136 to the drain port 110 of the linear solenoid valve SL1. Thus, the first and third clutches C1, C3 are engaged, and the third speed step "$3^{rd}$" is established, like in the first embodiment. A state in which the spool valve member of the high-low switch valve 140 is moved to the low-speed-side communication position thereof is a low-speed-side communication state of the valve 140. The linear solenoid valves SL1, SL2 correspond to a first and a second transmission-related solenoid valve recited in claim 4, respectively; and the first and third clutches C1, C3 correspond to escape-related frictional coupling devices. In addition, the first clutch C1 corresponds to a low-speed-side, hydraulically operated frictional coupling device that is engaged to establish each of a plurality of low-speed-side speed steps; and the second clutch C2 corresponds to a high-speed-side, hydraulically operated frictional coupling device that is engaged to establish each of a plurality of high-speed-side speed steps.

When a forward-run speed step not lower than the sixth speed step "$6^{th}$" is established, the SL2 hydraulic pressure moves, against the biasing force of the spring 142, the spool valve member toward an opposite position, i.e., a high-speed-side communication position thereof in which the high-low switch valve 140 connects the fluid passage 136 to the drain port 110 of the linear solenoid valve SL2, and additionally receives the line hydraulic pressure PL that presses the spool valve member toward the high-speed-side communication position thereof. Therefore, if, from this state, the linear solenoid valves SL1 through SL6 fall in the off-fail state, the line hydraulic pressure PL holds, against the biasing force of the spring 142, the spool valve member of the high-low switch valve 140 at the high-speed-side communication position thereof, so that the forward-run hydraulic pressure $P_D$ is supplied from the fluid passage 136 to the drain port 110 of the linear solenoid valve SL2. Thus, the second and third clutches C2, C3 are engaged, and the seventh speed step "$7^{th}$" is established. The biasing force of the spring 142 is smaller than the pressing load of the line hydraulic pressure PL. A state in which the spool valve member of the high-low switch valve 140 is moved to the high-speed-side communication position thereof is a high-speed-side communication state of the valve 140. The second and third clutches C2, C3 correspond to escape-related frictional coupling devices.

When the fifth forward-run speed step "$5^{th}$" in which both the SL1 hydraulic pressure and the SL2 hydraulic pressure are outputted is established, the spool valve member of the high-low switch valve 140 is held at either the low-speed-side communication position thereof or the high-speed-side communication position thereof, depending upon a history of the previously established speed step(s). When the spool valve member is held at the low-speed-side communication position, the third speed step "$3^{rd}$" is established; and when the spool valve member is held at the high-speed-side communication position, the seventh speed step "$7^{th}$" is established. More specifically described, for example, in the case where the speed step preceding the current, fifth speed step "$5^{th}$" is not higher than the fourth speed step "$4^{th}$", the SL1 hydraulic pressure and the biasing force of the spring 142 cooperate with each other to hold, against the SL2 hydraulic pressure, the spool valve member at the low-speed-side communication position thereof. If, from this state, the linear solenoid valves SL1 through SL6 fall in the off-fail state, the spool valve member is held, owing to the biasing force of the spring 142, at the low-speed-side communication position thereof, and the third speed step "$3^{rd}$" is established, though the seventh speed step "$7^{th}$" may be established depending upon a timing when the valves SL1 through SL6 fall in the off-fail state. Meanwhile, in the case where the speed step preceding the current, fifth speed step "$5^{th}$" is not lower than the sixth speed step "$6^{th}$", the SL2 hydraulic pressure holds, against the SL1 hydraulic pressure, the spool valve member at the high-speed-side communication position thereof. In addition, since the high-low switch valve 140 receives the line hydraulic pressure PL, the spool valve member is held at the high-speed-side communication position thereof. If, from this state, the linear solenoid valves SL1 through SL6 fall in the off-fail state, the spool valve member is held, owing to the line pressure PL, at the high-speed-side communication position thereof, and the seventh speed step "$7^{th}$" is established, though the third speed step "$3^{rd}$" may be established depending upon a timing when the valves SL1 through SL6 fall in the off-fail state.

Thus, in the second embodiment, if the linear solenoid valves SL1 through SL6 fall in the so-called "off-fail" state when the vehicle is running in any of the low-speed-side speed steps not higher than the fourth speed step "$4^{th}$", the third speed step "$3^{rd}$" is established; if the valves SL1 through SL6 fall in the off-fail state when the vehicle is running in any of the high-speed-side speed steps not lower than the sixth speed step "$6^{th}$", the seventh speed step "$7^{th}$" is established; and if the valves SL1 through SL6 fall in the off-fail state when the vehicle is running in the fifth speed step "$5^{th}$", the third speed step "$3^{rd}$" or the seventh speed step "$7^{th}$" is established. Therefore, even when the solenoid valves SL1 through SL6 fall in the off-fail state, the speed steps can be prevented from being largely changed or shifted, and the driving force to drive or run the vehicle can be prevented from being largely changed.

In addition, in the second embodiment, the high-low switch valve 140 receives, as the high-speed-side signal pressure, the SL2 hydraulic pressure, i.e., the hydraulic pressure used to cause the engaging of the second clutch C2 so as to establish each one of the high-speed-side speed steps not lower than the fifth speed step "$5^{th}$" and receives, as the low-speed-side signal pressure, the SL1 hydraulic pressure, i.e., the hydraulic pressure used to cause the engaging of the first clutch C1 so as to establish each one of the low-speed-side speed steps not higher than the fifth speed step "$5^{th}$". Depending upon the presence or absence of the high-speed-side and/or low-speed-side signal pressures SL2, SL1, the spool valve member of the high-low switch valve 140 is mechanically moved to the low-pressure-side communication position or the high-pressure-side communication position. Therefore, even when a failure such as stopping of supplying of electric power caused by, e.g., disconnecting of a connector occurs, an appropriate speed step, i.e., an appropriate one of the third and seventh speed steps "$3^{rd}$", "$7^{th}$" can be established depending upon whether the vehicle is running in the high-speed-side or low-speed-side speed step.

Even when the seventh speed step "7th" may be established in the off-fail state, the line hydraulic pressure PL gradually lowers and the spool valve member of the high-low switch valve 140 is moved toward the low-speed-side communication position thereof, owing to the biasing force of the spring 142, and eventually the seventh speed step "7th" is shifted down to the third speed step "3rd". Thus, the vehicle can exhibit a certain running performance. The high-low switch valve 140 may be adapted to receive, in place of the line hydraulic pressure PL, the forward-run hydraulic pressure $P_D$ outputted by the manual valve 118. In this case, when the driver moves the shift lever 72 to the N (neutral) position, the supplying of the forward-run hydraulic pressure $P_D$ to the high-low switch valve 140 is stopped, and accordingly the spool valve member of the high-low switch valve 140 is moved to the low-speed-side communication position thereof.

It is to be understood that the present invention may be embodied with various other changes, modifications and improvements that may occur to a person skilled in the art, without departing from the scope and spirit of the present invention.

What is claimed is:

1. A hydraulic control apparatus for use with an automatic transmission of a vehicle, the automatic transmission establishing each of a plurality of speed steps having respective different speed ratios, according to a corresponding one of a plurality of combinations of respective selective engaging and releasing of a plurality of hydraulically operated frictional coupling devices, the hydraulic control apparatus comprising:
    a plurality of transmission-related solenoid valves which correspond to the hydraulically operated frictional coupling devices, respectively, and each of which has an input port to which a first hydraulic pressure is inputted, an output port from which a second hydraulic pressure is outputted, and a drain port from which a hydraulic fluid is drained, and includes a solenoid which changes a state in which the input port, the output port, and the drain port communicate with each other, so that said each transmission-related solenoid valve outputs, from the output port thereof, the second hydraulic pressure and thereby causes the engaging of a corresponding one of the hydraulically operated frictional coupling devices; and
    a fail-safe switch valve which has at least one escape-related output port connected to the drain port of at least one transmission-related solenoid valve corresponding to at least one escape-related frictional coupling device of the hydraulically operated frictional coupling devices that is to establish at least one escape-related speed step, and additionally has at least one escape-related input port to which a third hydraulic pressure is inputted, and at least one drain port from which the hydraulic fluid is drained, wherein the fail-safe switch valve is selectively switchable to a normal communication state thereof in which said at least one escape-related output port and said at least one drain port are communicated with each other and said at least one escape-related input port is shut off, and to a fail-related communication state thereof in which said at least one escape-related output port and said at least one escape-related input port are communicated with each other, and said at least one drain port is shut off, so that a fourth hydraulic pressure is supplied from said at least one escape-related output port of the fail-safe switch valve to the drain port of said at least one transmission-related solenoid valve corresponding to said at least one escape-related frictional coupling device.

2. The hydraulic control apparatus according to claim 1, further comprising a fail-related valve switching device which normally holds the fail-safe switch valve at the normal communication state thereof and, when the transmission-related solenoid valves fall in an off-fail state thereof in which the output port of each of the transmission-related solenoid valves communicates with the drain port thereof and said each transmission-related solenoid valve does not output the second hydraulic pressure, switches the fail-safe switch valve to the fail-related communication state thereof.

3. The hydraulic control apparatus according to claim 2, further comprising:
    a shift lever which is selectively operable by a driver to each of a plurality of operation positions so as to select a corresponding one of the speed steps of the automatic transmission; and
    a manual valve which mechanically selects each of a plurality of fluid channels respectively corresponding to the operation positions to said each one of which the shift lever is selectively operable by the driver,
    wherein the fail-safe switch valve has a plurality of said escape-related input ports each of which receives the third hydraulic pressure from a corresponding one of the fluid channels, and additionally has a plurality of said escape-related output ports which are respectively connected to a plurality of said transmission-related solenoid valves respectively corresponding to a plurality of said escape-related frictional coupling devices to establish a plurality of said escape-related speed steps, respectively, and
    wherein when the shift lever is operated to said each operation position and the manual valve mechanically selects one of the fluid channels that corresponds to said each operation position, the fail-safe switch valve receives the third hydraulic pressure at one of the escape-related input ports thereof that corresponds to said one fluid channel mechanically selected by the manual valve, and outputs the fourth hydraulic pressure from one of the escape-related output ports thereof that corresponds to said one escape-related input port, to a corresponding one of the transmission-related solenoid valves so as to establish a corresponding one of the escape-related speed steps.

4. The hydraulic control apparatus according to claim 3, wherein the transmission-related solenoid valves comprise at least a first transmission-related solenoid valve which outputs the second hydraulic pressure to establish a low-speed-side speed step of the speed steps, and a second transmission-related solenoid valve which outputs the second hydraulic pressure to establish a high-speed-side speed step of the speed steps, and
    wherein the hydraulic control apparatus further comprises a high-low switch valve which is provided between the fail-safe switch valve and each of the first and second transmission-related solenoid valves, and which is selectively switchable to a low-speed-side communication state thereof in which the high-low switch valve causes the fourth hydraulic pressure outputted from said at least one escape-related output port of the fail-safe switch valve, to be supplied to the drain port of the first transmission-related solenoid valve, and to a high-speed-side communication state thereof in which the high-low switch valve causes the fourth hydraulic pressure outputted from said at least one escape-related output port of the fail-safe switch valve, to be supplied to the drain port of the second transmission-related solenoid valve.

5. The hydraulic control apparatus according to claim 4, wherein the second transmission-related solenoid valve outputs the second hydraulic pressure to one of the hydraulically operated frictional coupling devices so as to establish each one of a plurality of said high-speed-side speed steps, and wherein the high-low switch valve receives, as a high-speed-side signal pressure, the second hydraulic pressure to cause the engaging of said one hydraulically operated frictional coupling device, and is mechanically switched, when receiving the high-speed-side signal pressure, from the low-speed-side communication state thereof to the high-speed-side communication state thereof, and is mechanically switched, when receiving of the high-speed-side signal pressure is stopped, from the high-speed-side communication state thereof to the low-speed-side communication state thereof.

6. The hydraulic control apparatus according to claim 2, wherein the transmission-related solenoid valves comprise at least a first transmission-related solenoid valve which outputs the second hydraulic pressure to establish a low-speed-side speed step of the speed steps, and a second transmission-related solenoid valve which outputs the second hydraulic pressure to establish a high-speed-side speed step of the speed steps, and wherein the hydraulic control apparatus further comprises a high-low switch valve which is provided between the fail-safe switch valve and each of the first and second transmission-related solenoid valves, and which is selectively switchable to a low-speed-side communication state thereof in which the high-low switch valve causes the fourth hydraulic pressure outputted from said at least one escape-related output port of the fail-safe switch valve, to be supplied to the drain port of the first transmission-related solenoid valve, and to a high-speed-side communication state thereof in which the high-low switch valve causes the fourth hydraulic pressure outputted from said at least one escape-related output port of the fail-safe switch valve, to be supplied to the drain port of the second transmission-related solenoid valve.

7. The hydraulic control apparatus according to claim 6, wherein the second transmission-related solenoid valve outputs the second hydraulic pressure to one of the hydraulically operated frictional coupling devices so as to establish each one of a plurality of said high-speed-side speed steps, and wherein the high-low switch valve receives, as a high-speed-side signal pressure, the second hydraulic pressure to cause the engaging of said one hydraulically operated frictional coupling device, and is mechanically switched, when receiving the high-speed-side signal pressure, from the low-speed-side communication state thereof to the high-speed-side communication state thereof, and is mechanically switched, when receiving of the high-speed-side signal pressure is stopped, from the high-speed-side communication state thereof to the low-speed-side communication state thereof.

8. The hydraulic control apparatus according to claim 1, further comprising:

a shift lever which is selectively operable by a driver to each of a plurality of operation positions so as to select a corresponding one of the speed steps of the automatic transmission; and a manual valve which mechanically selects each of a plurality of fluid channels respectively corresponding to the operation positions to said each one of which the shift lever is selectively operable by the driver, wherein the fail-safe switch valve has a plurality of said escape-related input ports each of which receives the third hydraulic pressure from a corresponding one of the fluid channels, and additionally has a plurality of said escape-related output ports which are respectively connected to a plurality of said transmission-related solenoid valves respectively corresponding to a plurality of said escape-related frictional coupling devices to establish a plurality of said escape-related speed steps, respectively, and wherein when the shift lever is operated to said each operation position and the manual valve mechanically selects one of the fluid channels that corresponds to said each operation position, the fail-safe switch valve receives the third hydraulic pressure at one of the escape-related input ports thereof that corresponds to said one fluid channel mechanically selected by the manual valve, and outputs the fourth hydraulic pressure from one of the escape-related output ports thereof that corresponds to said one escape-related input port, to a corresponding one of the transmission-related solenoid valves so as to establish a corresponding one of the escape-related speed steps.

9. The hydraulic control apparatus according to claim 8, wherein the transmission-related solenoid valves comprise at least a first transmission-related solenoid valve which outputs the second hydraulic pressure to establish a low-speed-side speed step of the speed steps, and a second transmission-related solenoid valve which outputs the second hydraulic pressure to establish a high-speed-side speed step of the speed steps, and wherein the hydraulic control apparatus further comprises a high-low switch valve which is provided between the fail-safe switch valve and each of the first and second transmission-related solenoid valves, and which is selectively switchable to a low-speed-side communication state thereof in which the high-low switch valve causes the fourth hydraulic pressure outputted from said at least one escape-related output port of the fail-safe switch valve, to be supplied to the drain port of the first transmission-related solenoid valve, and to a high-speed-side communication state thereof in which the high-low switch valve causes the fourth hydraulic pressure outputted from said at least one escape-related output port of the fail-safe switch valve, to be supplied to the drain port of the second transmission-related solenoid valve.

10. The hydraulic control apparatus according to claim 9, wherein the second transmission-related solenoid valve outputs the second hydraulic pressure to one of the hydraulically operated frictional coupling devices so as to establish each one of a plurality of said high-speed-side speed steps, and wherein the high-low switch valve receives, as a high-speed-side signal pressure, the second hydraulic pressure to cause the engaging of said one hydraulically operated frictional coupling device, and is mechanically switched, when receiving the high-speed-side signal pressure, from the low-speed-side communication state thereof to the high-speed-side communication state thereof, and is mechanically switched, when receiving of the high-speed-side signal pressure is stopped, from the high-speed-side communication state thereof to the low-speed-side communication state thereof.

11. The hydraulic control apparatus according to claim 1, wherein the transmission-related solenoid valves comprise at least a first transmission-related solenoid valve which outputs the second hydraulic pressure to establish a low-speed-side speed step of the speed steps, and a second transmission-related solenoid valve which outputs the second hydraulic pressure to establish a high-speed-side speed step of the speed steps, and wherein the hydraulic control apparatus further comprises a high-low switch valve which is provided between the fail-safe switch valve and each of the first and second transmission-related solenoid valves, and which is selectively switchable to a low-speed-side communication state thereof in which the high-low switch valve causes the fourth hydraulic pressure outputted from said at least one escape-related output port of the fail-safe switch valve, to be supplied to the drain port of the first transmission-related solenoid valve, and to a high-speed-side communication state thereof in which the high-low switch valve causes the fourth hydraulic pressure outputted from said at least one escape-related output port of the fail-safe switch valve, to be supplied to the drain port of the second transmission-related solenoid valve.

12. The hydraulic control apparatus according to claim 11, wherein the second transmission-related solenoid valve outputs the second hydraulic pressure to one of the hydraulically operated frictional coupling devices so as to establish each one of a plurality of said high-speed-side speed steps, and wherein the high-low switch valve receives, as a high-speed-side signal pressure, the second hydraulic pressure to cause the engaging of said one hydraulically operated frictional coupling device, and is mechanically switched, when receiving the high-speed-side signal pressure, from the low-speed-side communication state thereof to the high-speed-side communication state thereof, and is mechanically switched, when receiving of the high-speed-side signal pressure is stopped, from the high-speed-side communication state thereof to the low-speed-side communication state thereof.

* * * * *